Sept. 19, 1950
R. E. OLSON ET AL
2,522,796
PASTEURIZING SYSTEM
Filed Jan. 9, 1948
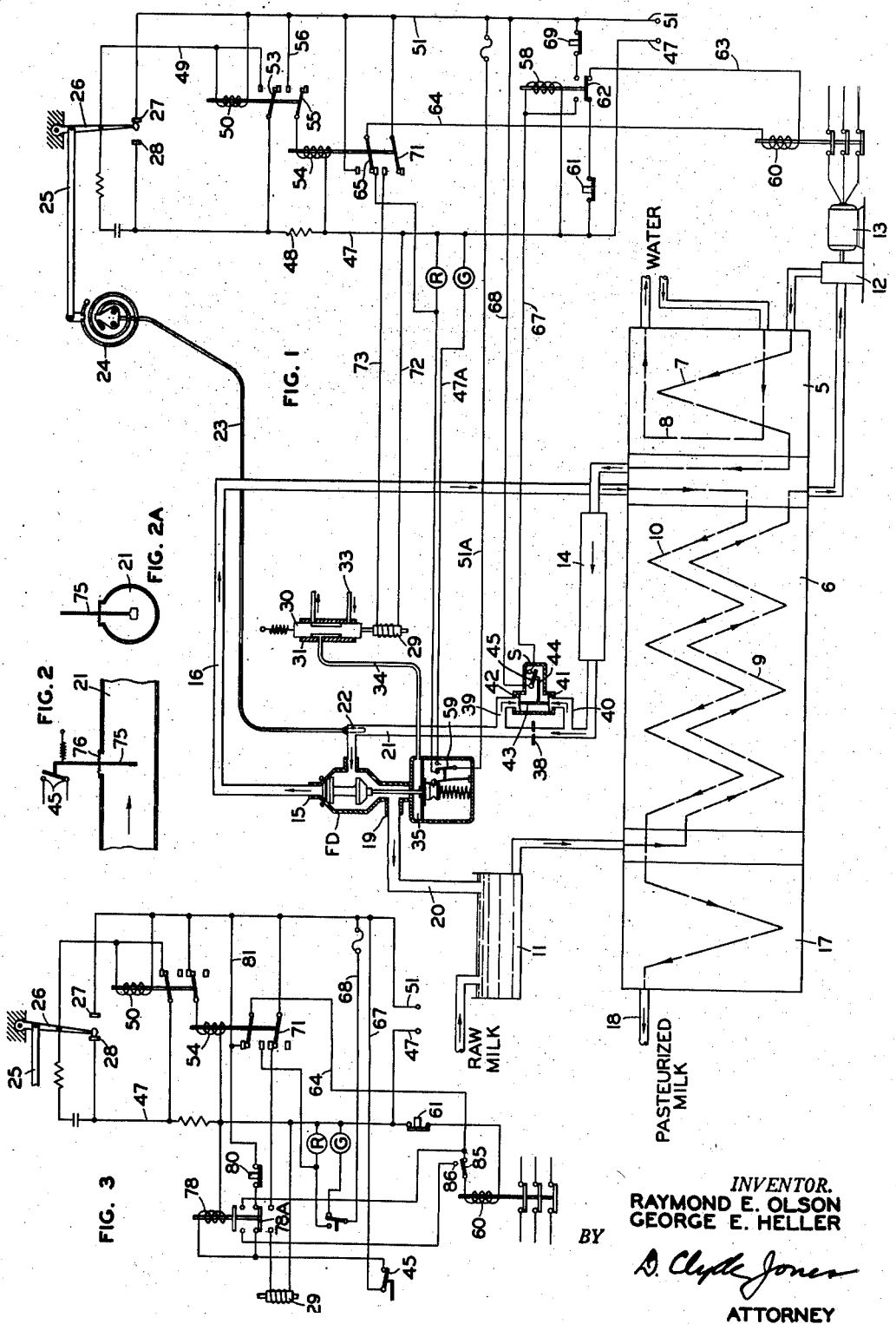
INVENTOR.
RAYMOND E. OLSON
GEORGE E. HELLER
BY
D. Clyde Jones
ATTORNEY Patented Sept. 19, 1950

2,522,796

UNITED STATES PATENT OFFICE 2,522,796

PASTEURIZING SYSTEM

Raymond E. Olson, Pittsford, and George E. Heller, Rochester, N. Y., assignors to Taylor Instrument Companies, Rochester, N. Y., a corporation of New York Application January 9, 1948, Serial No. 1,306

7 Claims. (Cl. 257—2)

This invention relates to a method of and to apparatus for pasteurizing a liquid in a so-called short-time pasteurizer.

For example, in the pasteurization of milk, the U. S. Public Health Service code requires that every particle of milk shall remain in the holding tube for a period of not less than fifteen seconds and that the temperature shall be not less than 160 degrees F.

In the past, in the short-time pasteurization of milk or the like, the holding tube communicates with the inlet of a flow diversion valve which is provided with a forward flow discharge port and a diverting discharge port. Thermosensitive means responsive to the temperature of the milk in the holding tube is effective to position the flow diversion valve so that while the milk is at or above the predetermined temperature, the inlet of the valve communicates with the forward flow discharge port from which the milk passes to a bottling machine or the like. However, if the temperature of the milk drops below the predetermined value, the inlet port of the flow diversion valve is connected to the diverting discharge port so that the milk can be repasteurized until its temperature is at the required value. In such a short-time pasteurizing system, it is intended that the milk be pumped through the holding tube at such a speed that it takes each particle of milk fifteen seconds to pass therethrough. In accordance with the conventional practice, public health authorities adjust the speed of the motor that drives the pump. This motor, when thus adjusted, is locked so that it cannot be tampered with. On rare occasions, the speed of the motor and consequently the speed of the pump can deviate from the required value. If the speed of the pump increases, it will be appreciated that a particle of milk will pass through the holding tube in less than the specified fifteen seconds so that proper pasteurization is not effected.

In accordance with the present invention, when the velocity of the milk passing through the holding tube exceeds a predetermined value, the milk from the holding tube is prevented from reaching the bottling machine until such time as each particle of milk traverses the holding tube in not less than fifteen seconds.

In accordance with another feature of the invention, the flow diversion valve is a short-time pasteurizing system is operated to its diverting position in response alternatively either to a drop in temperature of or to the increased velocity of the milk passing through the holding tube.

Various features and advantages of the invention will appear from the detailed description and claims when taking the drawings in which:

Fig. 1 is a diagrammatic showing of a pasteurizing system of the present invention and with which the method of this invention can be practised;

Figs. 2 and 2A are respectively a longitudinal section and a transverse section of a modified form of velocity sensing device; and Fig. 3 is a modified form of the system shown in Fig. 1.

In the system disclosed in Fig. 1, there is included a combined heater unit 5 and a regenerating unit 6. In the heater unit the milk or other liquid to be pasteurized flows through a set of coils or plates 7 in heat exchange relation to a set of heating coils or plates 8 through which there is recirculated water maintained at a temperature slightly above the pasteurizing temperature. The regenerating unit 6 includes two passageways 9 and 10 in heat exchange relation to each other. The raw milk from the tank 11 is pumped by a pump 12 through passageway 9 of the regenerator and thence through passageway 7 of the heater. It will be understood that the pump 12 is driven by any suitable constant speed motor 13. The milk leaving the heater passageway 7 passes into a suitable holding tube 14, through which the milk travels at such a speed that each traveling particle of milk is in the holding tube for a period of fifteen seconds. The holding tube discharges through the pipe 21 into the inlet port of a flow diversion valve FD of a construction similar to that disclosed in the patent of R. E. Olson, 2,472,984, granted June 14, 1949.

If the milk is above the required temperature, the flow diversion valve will have its movable portion in the reverse position from that shown in Fig. 1, so that the inlet port communicates with the forward flow discharge port 15 of this valve. From the forward flow port, the pasteurized milk flows through pipe 16 and through passageway 10 of the regenerator. This regenerator conducts the pasteurized milk from the holding tube, in heat exchange relation to the raw milk in the passageway 9, thereby serving to cool the pasteurized milk and to heat partially the incoming milk. The pasteurized milk from the passageway 9 flows through cooler 17 and through pipe 18 to a bottling machine or the like (not shown).

If, however, the milk in the holding tube 14 has not been heated to the proper temperature, the flow diversion valve FD will position its movable portion as shown in Fig. 1 so that the inlet portion of this valve communicates with the diverting discharge port 19. Under this positioning of the flow diversion valve, the improperly pasteurized milk will flow through passageway 20 into the tank 11 so that this milk can be reprocessed.

The temperature of the pasteurized milk is preferably sensed near the discharge end of the holding tube 14. As herein illustrated, the temperature of this milk is sensed by a thermoelectrical device, which comprises a tube system including a bulb 22 subjected to the temperature of the pasteurized milk, the bulb communicating through capillary tube 23 with a Bourdon spring 24. The bulb as well as the capillary tube and the Bourdon spring are filled with a thermosensitive medium in accordance with the well-known practice. The movable end of the Bourdon spring actuates a link 25 which swings a pivoted arm 26 between a low-temperature contact 27 and a high-temperature contact 28. The pivoted arm 26 and the fixed contacts 27 and 28 constitute an electrical switch. This switch governs electric circuits (to be described) of the solenoid 29 to position the movable element 30 of an electro-pneumatic valve 31 so that when proper pasteurizing conditions prevail, this movable element will be moved to the alternate position from that shown in Fig. 1. Thus the air supply pipe 33 is connected to the pipe 34 communicating with the diaphragm motor 35 of the flow diversion valve. This diaphragm motor, when thus supplied with compressed air, moves the movable portion of the flow diversion valve to its alternate position from that shown, so that the pasteurized milk passes through the forward flow discharge port 15 and through pipe 16 as well as the remainder of the system as previously mentioned.

In accordance with the present invention, provision is also made for preventing the discharge of milk to the discharge port 15, in the event that each particle of pasteurized milk fails to remain in the holding tube for at least fifteen seconds. Various means can be utilized to sense the condition that the milk has traveled through the holding tube for less than the prescribed period of time. As shown in Fig. 1, this sensing means comprises a differential switch mechanism S. In connection with this mechanism, an orifice plate 38 is introduced into pipe 21. At each side of the orifice pipe there are provided branch pipes 39 and 40. The end of the pipe 40 is closed by a flexible diaphragm 41 while the end of branch pipe 39 is closed by a flexible diaphragm 42. These two diaphragms, which are in alinement, are connected by an arm 43. The arm 43 carries the bracket 44 to control the switch contact 45. The arrangement is such that with the proper flow of milk through the orifice in plate 38, the differential pressure applied to the diaphragms 41 and 42 will be such that the switch contact 45 will be open, whereas, if the rate of flow increases abnormally, the pressure on these diaphragms will be such that the switch contacts 45 will be closed. The closure of the contacts 45 are effective in the arrangement shown in Fig. 1, to interrupt the circuit to be described of pump motor 13 so that the pump will stop advancing milk through the holding tube.

The operation of the circuits shown in Fig. 1 will first be described under the assumed conditions that the milk in the holding tube is at the required temperature and that each particle of milk is moving at such a velocity that it requires fifteen seconds for it to travel through the holding tube. The operation of the circuit under abnormal conditions will then be described.

With the temperature of the milk at the prescribed value, the pivoted arm 26 will be in engagement with the high-temperature contact 28 of the switch. Under this condition, a circuit will be completed from one side of the current source, the supply conductor 47, resistor 48, switch contact 28, pivoted arm 26, conductor 49, winding of the relay 50, supply conductor 51 to the other side of the current source. Under the control of this circuit, the relay 50 is energized and locks itself in this condition, in a circuit now traceable over conductor 47, resistor 48, armature 53, and front contacts, as well as the winding of the relay 50, to the supply conductor 51. Relay 50 is thus locked energized until the pivoted arm 26 is swung into engagement with the contact 27 whenever the temperature of the milk drops below the prescribed temperature. With the pivoted arm 26 in engagement with the contact 27, the winding of the relay 50, is short-circuited by a circuit traceable from one side of the current source, conductor 47, resistor 48, armature 53 and front contacts of relay 50, conductor 49, arm 26, and contact 27, conductor 51 to the other side of the current source. It will be understood that the resistance of the winding of the relay 50 is such that it will not remain energized when in multiple with the resistance of the resistor 48.

With the relay 50 energized, the relay 54 is operated in a circuit including supply conductor 47, winding of relay 54, armature 55 and front contact of relay 50, conductor 56 to the other current supply conductor 51. When relay 54 is thus energized, it closes a circuit for operating solenoid 29 of the electro-pneumatic valve 31. This circuit may be described as extending from the current supply conductor 47, conductor 72, winding of solenoid 29, conductor 73, front contact and armature 71 of relay 54, to the current supply conductor 51. Solenoid 29 operates the valve 31 to supply compressed air to the diaphragm motor of the flow diversion valve. This adjusts the flow diversion valve to its forward flow position. With the flow diversion valve in its forward flow position, the switch 59 will be moved to its right-hand position in which the green lamp G is lighted. The lighting circuit extends from the current supply conductor 47, lamp G, conductor 47a, switch 59, conductor 51a, to the supply conductor 51. The green light indicates to the operator that the flow diversion valve is in its forward flow position.

Since it has been assumed that the milk is flowing normally through the holding tube, the switch S will have its contacts 45 opened so that the relay 58 is deenergized at this time. Under this condition and with the relay 50 energized a circuit is completed for the relay 60 which closes the operating circuit of the motor 13. The circuit for the relay 60 extends over supply conductor 47, push button 61, back contacts and armature 62 of relay 58, conductor 63, winding of the relay 60, conductor 64, armature 65 and front contact of relay 54, conductor 51 to the other side of the current source. As long as this circuit is completed, the motor 13 will operate the pump 12 to advance the milk through the holding tube 14. In the event that the operator desires at any time to stop the pump this is effected by depressing the push button 61 to interrupt the operating circuit of the relay 60. The relay 60 in turn releases to interrupt the operating circuit of the motor 13.

If, however, the temperature of the milk drops below the pasteurizing value, pivoted arm 26 will be moved into engagement with the low temperature contact 27. This is effective to deenergize the relay 50. Relay 50, at its armature 55 and front contact, opens the operating circuit of the relay 54 which deenergizes. Relay 54, at its armature 71, interrupts the operating circuit of the solenoid 29. This circuit, it will be recalled, extended from the current source over conductor 47, conductor 72, winding of the solenoid 29, conductor 73, front contact and armature 71 of the relay 54, conductor 51 to the other side of the current source. When the solenoid 29 is thus deenergized in response to the interruption of its circuit as just described, the movable part of the electro-pneumatic valve 31 moves to the position shown in Fig. 1 wherein the compressed air is cut off from the pipe 34 so that the flow diversion valve FD moves to the position shown in Fig. 1. In this position the improperly pasteurized milk is diverted through the diversion port 19 and pipe 20 back to the milk tanks.

Let it be assumed that the temperature of the milk is at the proper value, but the flow of the milk through the holding tube 14 is hurried. Under this condition, the pivoted arm 26 will remain in engagement with the high temperature contact 28 so that the relays 50, 54, and the solenoid 29 will remain energized. Under this condition, the flow diversion valve will be in its forward flow position so that the milk will tend to flow through the forward flow discharge port 15 and the pipe 16 through the remainder of the system as previously described. However, since the milk is traveling at an improper velocity through the holding tube, the differential pressure switch S will have its contacts 45 closed. In response to the closure of these contacts, the relay 58 will be energized. This circuit is traceable from one side of the current source, conductor 47, winding of the relay 58, conductor 67, switch contacts 45 now closed, conductors 68 and 51 to the other side of the current source. The relay 58 is energized in this circuit and its armature 62 and front contact interrupts the operating circuit of the relay 60 causing it to deenergize. The release of relay 60, in turn, interrupts the operating circuit of the motor 13 to stop pump 12. It will be noted that the relay 58, when thus operated, locks itself in this condition in a circuit traceable from one side of the current source, conductor 51, push button 69, armature 62, front contact and winding of relay 58, conductor 47 to the other side of the current source. Thus the relay 58 will be locked energized until the operator depresses the push button 69. Thus the motor 13 and its pump 12 can not be started until the operator pushes the button 69 which will take place after the abnormal operating conditions have been corrected.

In Figs. 2 and 2A there is indicated a modified form of switch for indicating the abnormal passage of milk through the holding tube 14. In this modification, a rigid blade 75 extends into the pipe 12. This blade is mounted on a flexible diaphragm 76 which is sealed in an opening at the upper side of the pipe 21. The blade 75 at its upper end actuates the movable element of the switch contacts 45 to close the switch whenever the velocity of the milk passing through the pipe 21 swings the blade 75 in a counterclockwise direction. It will be understood that this last described switch can be substituted for the switch S in the system shown in Fig. 1 without changing the operation of that system as described.

In the form of the invention shown in Fig. 1 the flow diversion valve is moved to its diverting position only when the temperature of the milk in the holding tube 14 drops below the prescribed value. In the arrangements of Fig. 1, when the milk travels abnormally through the holding tube 14, the circuits operate to stop the pump so that the milk is not forced through the system. In the modified form of the system shown in Fig. 3, whenever the milk travels at an abnormal velocity through the holding tube 14 the flow diversion valve FD is moved to its diverting position so that the milk can be diverted into the tank 11. Also in this arrangement the flow diversion valve moves to its diverting position whenever the temperature of the milk drops below the prescribed value. Otherwise expressed, in this arrangement the flow diversion valve is moved to its diverting position alternatively in response to an abnormal temperature of the milk and to an abnormal velocity of the milk passing through the holding tube. In this arrangement when the temperature is above the holding value the pivoted arm 26 will be positioned in engagement with the high temperature contact 28 so that relay 50 is energized as previously described. In response to the operation of the relay 50, the relay 54 is energized also as previously described. Relay 54 at its armature 71 and front contact closes a break point in the operating circuit of the solenoid 29 of the electro-pneumatic valve. If the velocity of the milk passing through the holding tube is at the proper value, the switch contacts 45 will be open so that relay 78 is deenergized to close at its armature and back contacts, the remaining break point in the operating circuit of solenoid 29. The solenoid 29 will then be operated to apply compressed air through valve 31, to the flow diversion valve FD so that it will be held in its forward flow position.

Let it be assumed, however, the the flow of milk is abnormal in the holding tube as a result of which the switch contact 45 will be closed. As a result of the closure of these contacts, the relay 78 will be energized in a circuit extending from the current source, conductor 47, winding of the relay 78, contacts 45 now closed, conductors 67 and 51 to the other side of the current source. The relay 78 is energized in this circuit and at its armature 78a and back contact, it opens the operating circuit of the solenoid 29 which causes the flow diversion valve to be operated to its diverted position. As soon as the relay 78 is energized it closes a locking circuit for itself from the current source, conductor 47, winding of relay 78, armature 78a and front contacts of this relay, push button 80, conductors 81 and 51 to the other side of the current source. Relay 78 will remain operated until its locking circuit is interrupted by the operator on the depression of the push button 80 when the abnormal conditions have been corrected. In this modification the operating circuits of the motor 13 is maintained complete by the relay 60 at the will of the operator. The circuit of the relay 60 is completed from the current source, conductor 47, push button 61, winding of the relay 60 through the double throw switch 85, conductor 64, armature and front contact of relay 54, conductor 51 to the other side of the current source.

If it is desired to stop the milk pump and also move the flow diversion valve FD to its diverting position when the velocity of the milk through the holding tube is abnormal, the double throw switch 85 is moved from the position shown in Fig 3 into engagement with the contact 86. Otherwise the operation of this circuit will be as already described.

What we claim is:

1. In a pasteurizing system, means for heating the liquid to be pasteurized to a predetermined temperature value, a tube of a given length through which the heated liquid flows, a pump for normally advancing the liquid through said tube at a given uniform velocity, a flow diversion valve having an inlet port into which said tube discharges, said valve having a forward flow discharge port and a diverting discharge port either of which ports is connectible to said inlet port, a thermally operated electrical switch actuated in response to a drop in temperature of the liquid below said given value, a velocity operated electrical switch actuated in response to a velocity of the liquid in excess of said given velocity value, electrically operated means for connecting said inlet port to said diverting discharge port, and an operating circuit for said electrical means interrupted in response to the actuation of either of said switches.

2. In a pasteurizing system, means for heating the liquid to be pasteurized to a predetermined temperature value, a tube of a given length through which the heated liquid flows, a pump for advancing the liquid through said tube at a given uniform velocity, a flow diversion valve having an inlet port into which said tube discharges, said valve having a forward flow discharge port and a diverting discharge port either of which ports is connectible to said inlet port, a thermally operated switch actuated in response to a drop in temperature of the liquid below said given value, a velocity operated switch actuated in response to an increase in the velocity of the liquid in excess of said given velocity value, electrical means for connecting said inlet port to said diverting discharge port, and an operating circuit for said electrical means controlled by said switches.

3. In a pasteurizing system, means for heating the liquid to be pasteurized to a predetermined temperature value, a tube of a given length through which the heated liquid flows, a pump for advancing the liquid through said tube at a given uniform velocity, a motor for operating said pump, a flow diversion valve having an inlet port into which said tube discharges, said valve having a forward flow discharge port and a diverting discharge port either of which ports is connectible to said inlet port, a thermally operated switch actuated in response to a drop in temperature of the liquid below said given value, a velocity operated switch actuated in response to an increase in the velocity of the liquid in excess of said given velocity value, electrically operated means for connecting said inlet port to said diverting discharge port, an operating circuit for said electrical means controlled by said thermal switch, and an operating circuit for said motor controlled by said velocity operated switch.

4. The method of pasteurizing a liquid which comprises heating the liquid to a given pasteurizing temperature, pumping the liquid at the given temperature and normally at a given uniform rate of flow through a region of a given length, to a primary path, sensing any increase in the rate of flow of the liquid in excess of said uniform rate, and diverting the flow of the liquid from said region to a secondary path as soon as there is a sensed increase in the rate of flow of the liquid through said region due to improper pumping.

5. The method of pasteurizing a liquid which comprises heating the liquid to a given pasteurizing temperature, advancing the liquid normally at a given uniform rate of flow through a region of a given length to a primary path, diverting the flow of the liquid from said region to a secondary path as soon as the liquid is advanced through said region at a rate of flow in excess of the given rate, and continuing the diversion of the liquid to said secondary path at the will of the operator.

6. In a pasteurizing system, means for heating a liquid to be pasteurized, a tube of a given length through which the heated liquid flows, a pump for normally advancing the liquid through said tube at a given uniform velocity, a flow diversion valve having an inlet port with which said tube communicates, said valve having a forward flow discharge port and a diverting discharge port, alternatively connectible to said inlet port, and means responsive to an increase in the velocity of the liquid flow through said tube for connecting said inlet port to said diverting discharge port.

7. In a pasteurizing system, means for heating the liquid to be pasteurized to a predetermined temperature value, a tube of a given length through which the heated liquid flows, a pump for normally advancing the liquid through said tube at a given uniform velocity, a flow diversion valve having an inlet port into which said tube discharges, said valve having a forward flow discharge port and a diverting discharge port alternatively connectible to said inlet port, and means responsive individually to a decrease in the temperature of said liquid and to an increase in the velocity of the liquid flowing through said tube for connecting said inlet port to said diverting discharge port.

RAYMOND E. OLSON.
GEORGE E. HELLER.

REFERENCES CITED

The following references are of record in the file of this patent:

UNITED STATES PATENTS

| Number | Name | Date |
| --- | --- | --- |
| 2,236,087 | Detwiler | Mar. 25, 1941 |

OTHER REFERENCES

Chemical Engineers Handbook, 2nd ed., published by McGraw-Hill Book Co., New York 1941, pages 2245 and 2264.